United States Patent
Macke

(10) Patent No.: US 8,506,142 B2
(45) Date of Patent: Aug. 13, 2013

(54) RESETTABLE BREAK-AWAY JOINT FOR A POLE ASSEMBLY

(75) Inventor: David J. Macke, Sidney, OH (US)

(73) Assignee: Honda Motor Co., Ltd., Tokyo (JP)

( * ) Notice: Subject to any disclaimer, the term of this patent is extended or adjusted under 35 U.S.C. 154(b) by 537 days.

(21) Appl. No.: 12/757,536

(22) Filed: Apr. 9, 2010

(65) Prior Publication Data

US 2011/0249454 A1    Oct. 13, 2011

(51) Int. Cl.
*B60Q 1/00* (2006.01)
*F21V 19/00* (2006.01)
*F16C 11/00* (2006.01)

(52) U.S. Cl.
USPC ............................. 362/493; 362/382; 403/145

(58) Field of Classification Search
None
See application file for complete search history.

(56) References Cited

U.S. PATENT DOCUMENTS

| | | | |
|---|---|---|---|
| 737,951 A | 9/1903 | McEachern | |
| 1,370,697 A | 3/1921 | Mann | |
| 1,679,623 A * | 8/1928 | Olsen | 40/608 |
| 1,962,126 A | 6/1934 | Andersen | |
| 2,462,560 A | 2/1949 | Schmidt | |
| 2,738,492 A * | 3/1956 | Arneson et al. | 362/493 |
| 3,489,157 A | 1/1970 | Pearlstine | |
| 3,614,733 A * | 10/1971 | Halligan | 362/540 |
| 4,032,248 A | 6/1977 | Parduhn et al. | |
| 4,565,466 A * | 1/1986 | Daggs et al. | 404/10 |
| 4,619,219 A | 10/1986 | Millard | |
| 4,695,025 A | 9/1987 | Vaughan | |
| 5,042,716 A | 8/1991 | Robbins | |
| 5,186,423 A | 2/1993 | Wakayama et al. | |
| 6,390,107 B1 | 5/2002 | Lin et al. | |
| 7,264,219 B2 | 9/2007 | Kicher et al. | |
| 7,363,930 B2 | 4/2008 | Vanderminden, Sr. | |

* cited by examiner

*Primary Examiner* — Britt D Hanley
(74) *Attorney, Agent, or Firm* — Rankin, Hill & Clark LLP

(57) ABSTRACT

A resettable break-away joint for a pole assembly includes a lower end of an upper pole member and an upper end of a lower pole member. A biasing mechanism urges the lower end of the upper pole member toward engagement with the upper end of the lower pole member to urge the upper pole member toward an upright position until the upper pole member is moved to a collapsed position.

16 Claims, 4 Drawing Sheets

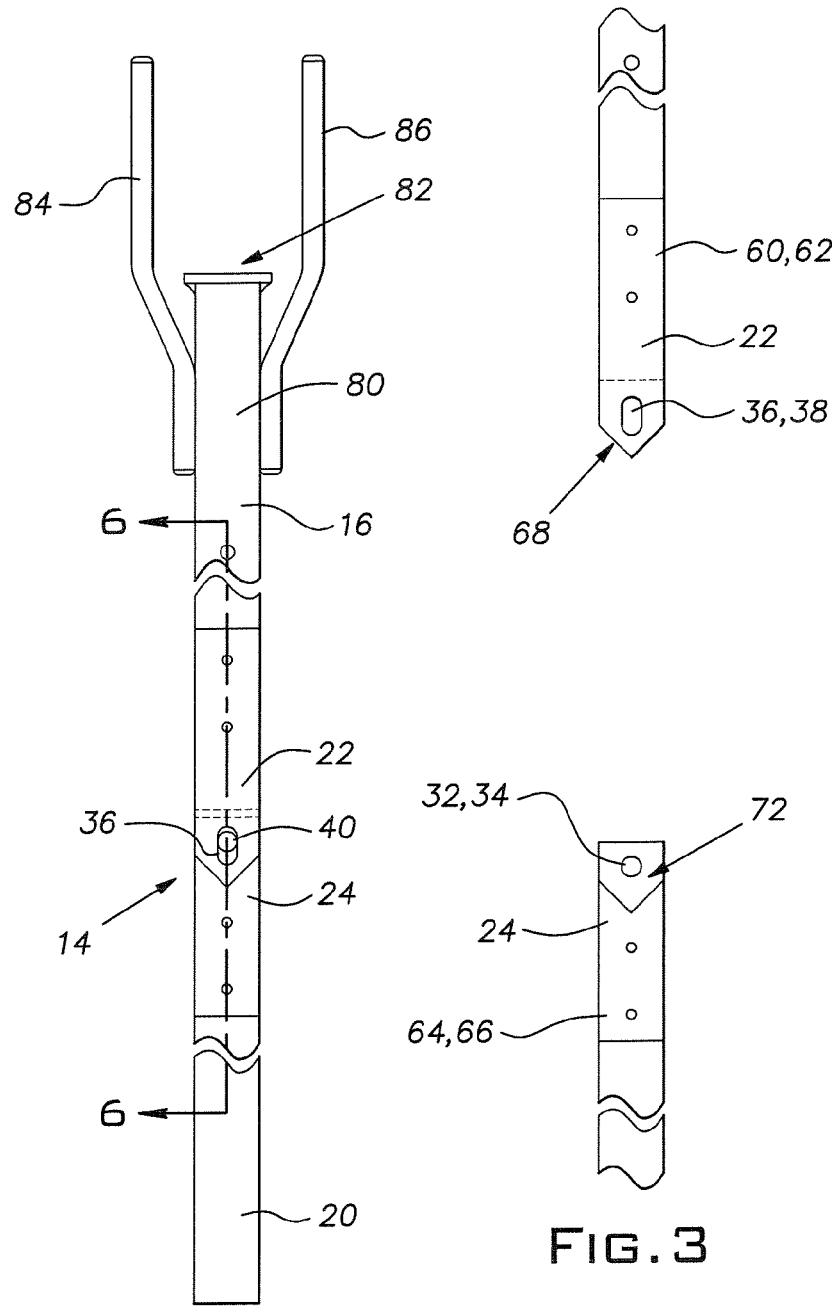

RESETTABLE BREAK-AWAY JOINT FOR A POLE ASSEMBLY

BACKGROUND

Exemplary embodiments herein relate to resettable break-away joints, and particularly relate to a break-away pole assembly having a resettable break-away joint, e.g., a light pole assembly for a utility vehicle.

Small industrial vehicles are used in many manufacturing facilities to transport personnel and/or cargo around the manufacturing facility. These vehicles come in many varieties including three-wheeled and four-wheeled, electric powered and combustion powered, etc. For safety reasons, one or more light poles can be mounted to these types of vehicles. Such a light pole can extend upward above the vehicle and include a light source, such as a flashing light, for alerting those around the vehicle of its presence.

To ensure good visibility of the light source on the light pole, the light pole can extend high above the vehicle. In particular, the pole can extend to a sufficient height so that the light source disposed distally on the pole is raised above any personnel or cargo (or other obstructions) carried on the industrial vehicle. Unfortunately, while tall light poles increase visibility, these same light poles can become obstacles during navigation of the industrial vehicle. For example, the light pole can inadvertently contact overhead obstructions or more generally any obstruction in the manufacturing facility. This can result in bent or broken light poles, and sometimes can result in transference of load forces to structural components of the vehicle and these components can be bent or broken. Once broken, manpower and other resources may need to be diverted to repairing the broken light pole or components on the industrial vehicles. The light pole can also cause property damage.

SUMMARY

According to one aspect, a light pole assembly for a utility vehicle includes an upper pole member for carrying a light source and a lower pole member mounted to the utility vehicle. A break-away joint connects the upper pole member and the lower pole member. The breakaway joint includes a biasing mechanism connected to the upper pole member and the lower pole member for urging the upper pole member into an upright position on the lower pole member.

According to another aspect, a break-away pole assembly includes an upper pole member and a lower pole member. A resettable break-away joint connects a lower end of the upper pole member to an upper end of the lower pole member. The resettable break-away joint has a biasing mechanism connected to the upper and lower pole members. The biasing mechanism urges the upper pole member into an upright position.

According to still another aspect, a resettable break-away joint for a pole assembly includes a lower end of an upper pole member and an upper end of a lower pole member. A biasing mechanism urges the lower end of the upper pole member toward engagement with the upper end of the lower pole member to urge the upper pole member toward an upright position until the upper pole member is moved to a collapsed position.

BRIEF DESCRIPTION OF THE DRAWINGS

FIG. 2 is an elevational view of the light pole assembly shown removed from the vehicle and without a light source.

FIG. 3 is a partial elevational view of a lower pole member of the light pole assembly of FIG. 2.

FIG. 4 is a partial elevational view of an upper pole member of the light pole assembly of FIG. 2.

FIG. 5 is a top plan view of the light pole assembly of FIG. 2.

DETAILED DESCRIPTION

Figure 1:
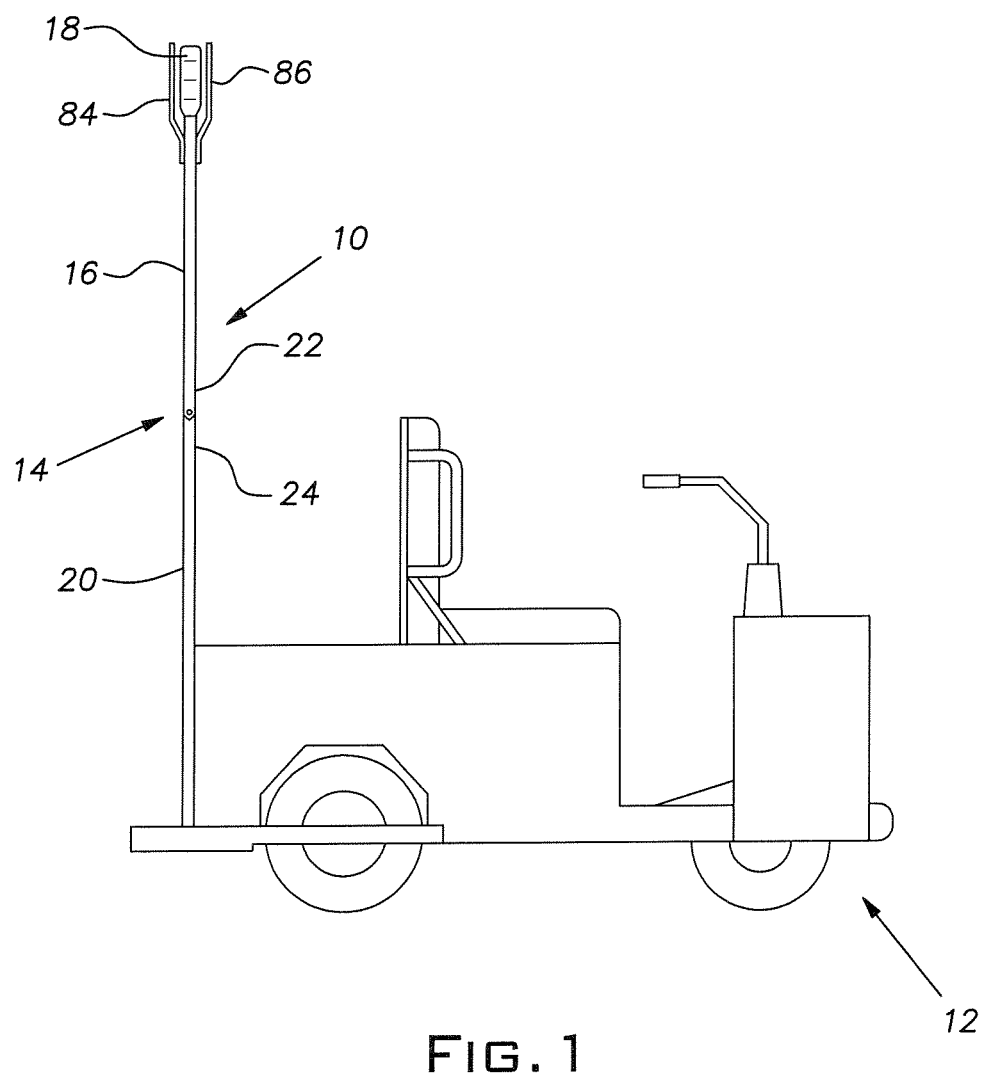
FIG. 1 is a perspective view of an industrial vehicle having a light pole assembly attached thereto, the light pole assembly including a resettable break-away joint.

Referring now to the drawings, wherein the showings are for purposes of illustrating one or more exemplary embodiments and not for purposes of limiting same, FIG. 1 illustrates a light pole assembly 10 for an industrial or utility vehicle 12. As will be described in more detail below, the light pole assembly 10, which can also be referred to as a break-away pole assembly, includes a resettable break-away joint 14 that allows the light pole assembly 10 to absorb collisions without becoming permanently damaged. It is to be appreciated by those skilled in the art that the illustrated industrial vehicle 12 is merely exemplary and the light pole assembly 10 could be provided on any type of vehicle or movable apparatus.

In the illustrated embodiment, the light pole assembly 10 having the resettable break-away joint 14 includes an upper pole member 16 for carrying a light source 18 and a lower pole member 20 mounted to the utility vehicle 12. With additional reference to FIGS. 2-6, the resettable break-away joint 14 connects a lower end 22 of the upper pole member 16 to an upper end 24 of the lower pole member 20. The resettable break-away joint 14 has a biasing mechanism 30 connected to the upper pole member 16 and the lower pole member 20 for urging the upper pole member 16 into the upright position (the position shown FIGS. 1 and 2) on the lower pole member 20. In particular, the biasing mechanism 30 urges the lower end 22 of the upper pole member 16 toward engagement with the upper end 24 of the lower pole member 20 to urge the upper pole member 16 toward its upright position until the upper pole member 16 is forcibly moved to a collapsed position.

Figures 6, 7:
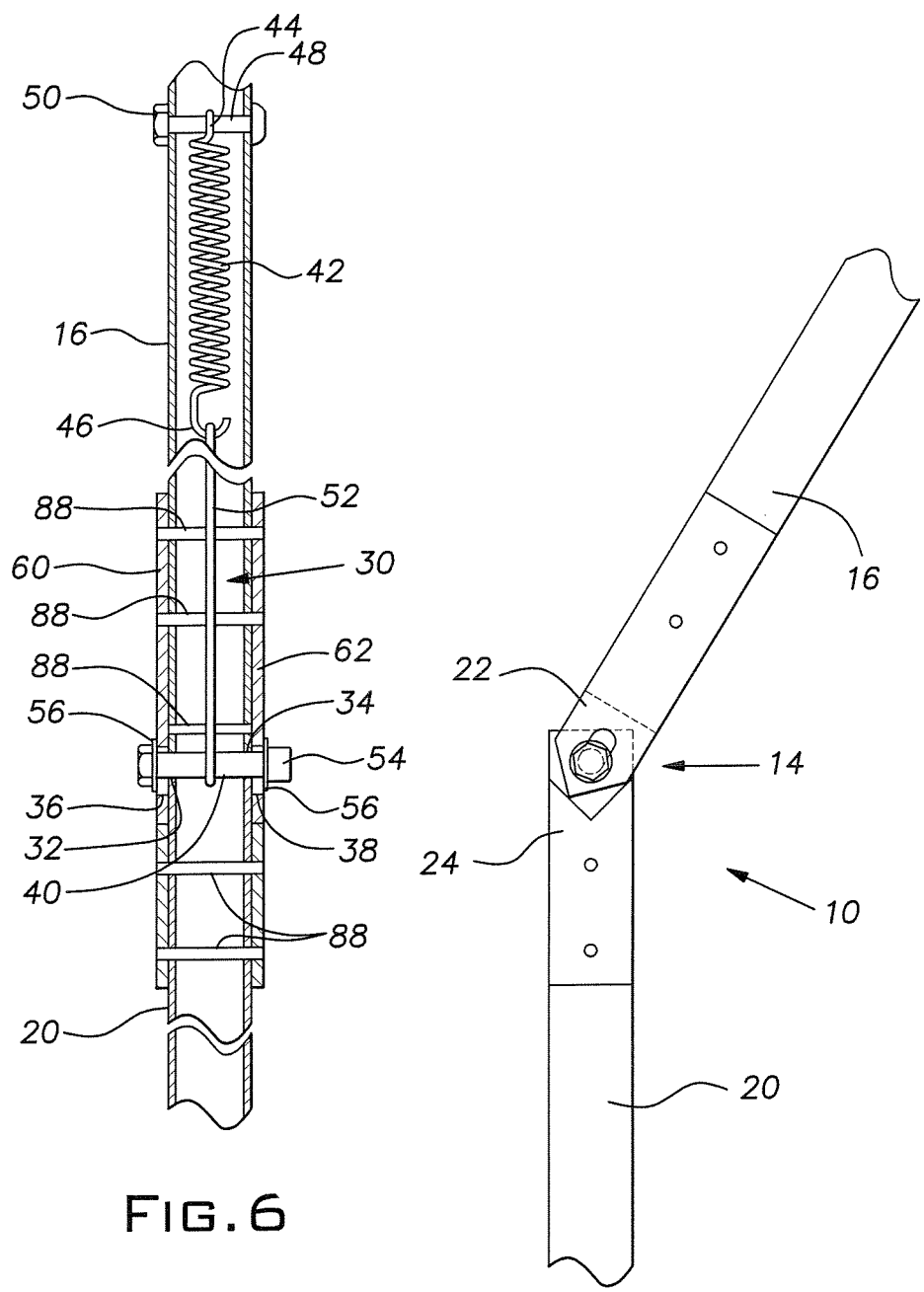
FIG. 6 is a partial cross-sectional view taken along the line 6-6 of FIG. 2.
FIG. 7 is a partial perspective view of the light pole assembly in a collapsed position.

The resettable break-away joint 14 further includes at least one aperture (e.g., apertures 32, 34) defined in the upper end 24 of the lower pole member 20 and at least one elongated aperture (e.g., slots 36, 38) defined in the lower end 22 of the upper pole member 16. As best shown in FIGS. 2 and 6, the at least one aperture 32, 34 of the lower pole member 20 is in registry with the at least one slot 36, 38 of the upper pole member 16. The biasing mechanism 30 additionally includes a biasing pin 40 received in the at least one slot 36, 38 of the upper pole member 16 and the at least one aperture 32, 34 of the lower pole member 20. As will be described in more detail below, relative movement between the biasing pin 40 and the at least one slot 36, 38 from a first position to a second position corresponds to the upper pole member 16 moving from its upright position to a collapsed position (shown in FIG. 7).

With specific reference to FIG. 6, the biasing mechanism 30 further includes a spring 42 having a first end 44 fixed to the upper pole member 16 and a second end 46 fixed to the lower pole member 20 for urging the upper pole member 16 toward the lower pole member 20 and thereby urging the upper pole member 16 to the upright position. In particular, the spring 42 can have its first end 44 secured to the lower end 22 of the upper pole member 16 and the second end 46 secured to the upper end 24 of the lower pole member 20. Specifically, the spring 42 urges the upper pole member 16 toward its upright position when the pin 40 is in its first position relative to the at least one elongated aperture 36, 38.

In the illustrated embodiment, the spring 42 is receiving inside the upper pole member 16 with the second end 46 of the spring 42 substantially fixed relative to the biasing pin 40 and the first end 44 of the spring 42 substantially fixed relative to a pin 48 extending through the upper pole member 16 at a location longitudinally spaced apart from the at least one elongated aperture 36, 38. In the illustrated embodiment, the pin 48 is a bolt received through the upper pole member 16 and secured in place by a nut 50. The first end 44 of the spring 42 can have a hook configuration for hooking onto the bolt 48. The second end 46 of the spring 42 can be fixed to the biasing pin 40 by a cable 52. The biasing pin 40 can be formed as a bolt received through the at least one aperture 32, 34 and the at least one slot 36, 38. A self locking nut 54 can be received on the biasing pin 40 to prevent inadvertent removal from the apertures 32, 34 and slots 36, 38. Spacers or washers 56 can be provided about the biasing pin 40 flanking the upper and lower pole members 16, 20 to facilitate relative sliding movement of the upper pole member 16 relative to the lower pole member 20.

The lower end 22 of the upper pole member 16 can have a male configuration and the upper end of the lower pole member 20 can have a female configuration. The male configuration of the upper pole member 16 and the female configuration of the lower pole member 20 can cooperate to limit relative movement between the upper pole member 16 and the lower pole member 20. In the illustrated embodiment, the male configuration of the lower end 22 is a protruding V-shape and the female configuration of the upper end 24 is a recessed V-shape. The protruding V-shape is complementarily or nestably received in the recessed V-shape when the upper pole member 16 is in its upright position.

More specifically, in the illustrated embodiment, each of the upper pole member 16 and the lower pole member 18 can be an elongated polygonal member (e.g., an extruded member having a hollow square cross section). The lower end 22 of the upper pole member 16 can include and/or be formed by a pair of spaced apart plate members 60, 62 and likewise the upper end 24 of the lower pole member 20 can include or be formed by a pair of spaced apart plate members 64, 66. The plate members 60, 62 of the lower end 22 each have the protruding V-shape 68 and the plate members 64, 66 of the upper end 24 each have the recessed V-shape 72. The plates 60-66 can be secured to the respective upper and lower pole member 16, 20 by any suitable means. In the illustrated embodiment, pins 88 are used to align the plate members 60-66 on the respective upper and lower pole members 16, 20 and, after alignment, the plate members 60-66 are welded to the pole members 16, 20. It is to be appreciated, however, that other connecting means and devices could be used (e.g., other fasteners, welding, etc.).

In the illustrated embodiment, the at least one slot of the lower end 22 is formed as slots 36, 38 in each of the plate members 60, 62 of the lower end 22 of the upper pole member 16 and the at least one aperture of the upper end 24 is formed as fitted apertures 32, 34 defined in sidewalls of the lower pole member 20 (e.g., in opposite walls of an extruded square shape). By fitted, these apertures 32, 34 can have a diameter that closely matches the diameter of the pin 40 such that the pin 40 is not generally linearly movable relative to the lower pole member 20. In contrast, the slots 36, 38 allow linear relative movement of the upper pole member 16 relative to the biasing pin 40 and thus the lower pole member 20. The biasing mechanism 30 urges the protruding V-shape of each of the plate members 60, 62 into the respective and complementary V-shaped recesses 72 of the lower plates 64, 66. The lower end 22 of the upper pole member 16 is urged towards engagement with the upper end 24 of the lower pole member 20 by the biasing mechanism 30.

An upper end 80 of the upper pole member 16 can include an appropriate mount 82 for mounting a light source, such as light source 18 illustrated in FIG. 1. Protective members 84, 86 can extend upward from the upper end 80 of the upper pole member 16 at locations offset relative to the light source 18 but generally along a height of the light source 18 for protecting the light source from damage due to various obstructions within a manufacturing facility.

Advantageously, with additional reference to FIG. 7, the light pole assembly 10 is able to absorb an impact to the upper pole member 16 without permanently damaging the light pole assembly 10. Instead, via the resettable break-away joint 14, the upper pole member 16 moves from its upright position to a collapsed position (as shown). In particular, when a force acts upon the upper pole member 16, the upper pole member 16 can lift away from the lower pole member 20 against the urging of the spring 42. Specifically, the plates 60, 62 having the slots 36, 38 move relative to the biasing pin 40 (i.e., the plates 60, 62 move such that the pin 40 is relocated to the second position relative to the plates 60, 62). This separation allows the V-shaped plates 60, 62 to rotate relative to the V-shaped recess plates 64, 66 and thereby allows the upper pole member 16 to be angularly displaced relative to the lower pole member 20.

Figure 8:
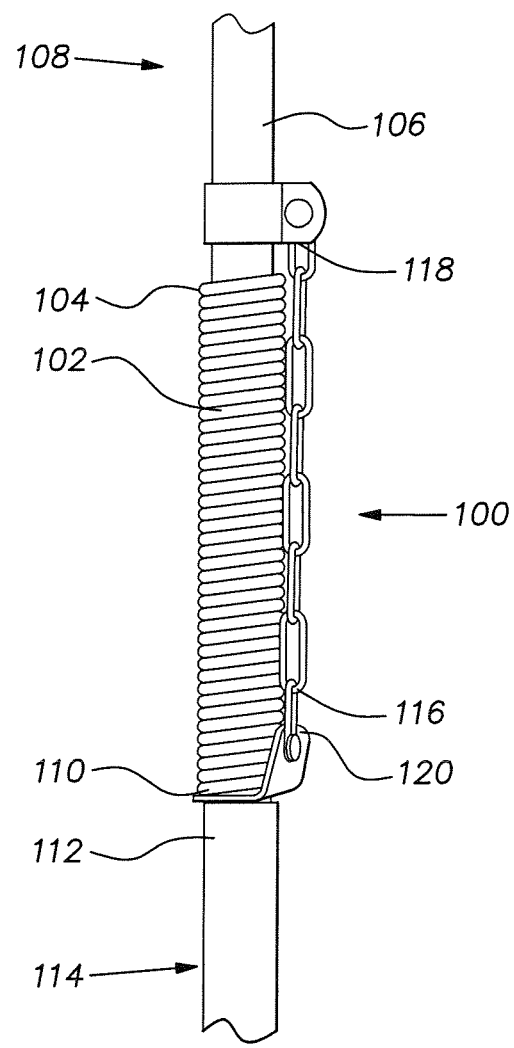
FIG. 8 is a partial elevational view of a light pole assembly according to an alternate embodiment.

With reference to FIG. 8, a break-away joint having a biasing mechanism 100 is shown according to an alternate embodiment. The biasing mechanism 100 includes a spring 102 having a first end 104 secured to a lower end 106 of an upper pole member 108 and a second 110 secured to an upper end 112 of a lower pole member 114. The biasing mechanism 100 further includes a tension member 116 having a first end 118 secured to the upper pole member 108 and a second end 120 secured to the lower pole member 114. The tension member 116 is offset relative to the spring 102 for allowing the upper pole member 108 to bend relative to the lower pole member 114 against the urging of the spring 102 only in a direction where a compression force is applied to the tension member 116.

In other words, the tension member 116 limits the direction in which the upper member 108 can be bent relative to the lower member 114 against the urging of the spring 102. Additionally, the tension member 116 prevents recoiling of the upper member 108 from a collapsed position to a position beyond the upright position. The tension member 116 can be said to be in eccentric relation relative to a light pole axis defined by the upper and lower pole members 108, 114 for allowing the upper pole member 108 to bend relative to the lower pole member 114 against the urging of the spring 102 only in a direction where a compression force is applied to the tension member.

It will be appreciated that various of the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A light pole assembly for a utility vehicle, comprising:
an upper pole member for carrying a light source;
a lower pole member mounted to the utility vehicle; and
a break-away joint connecting the upper pole member and the lower pole member, the break-away joint including biasing mechanism connected to the upper pole member and the lower pole member for urging the upper pole member into an upright position on the lower pole member, wherein the upper pole member has a lower end defining at least one slot and the lower pole member has an upper end defining at least one aperture that is in registry with the at least one slot, and wherein the biasing mechanism includes a biasing pin received in the at least one slot and the at least one aperture.

2. The light pole assembly of claim 1 wherein the lower end has a male configuration and the upper end has a female configuration, the male configuration and the female configuration cooperating to limit relative movement between the upper pole member and the lower pole member.

3. The light pole assembly of claim 2 wherein the male configuration is a protruding V-shape and the female configuration is a recessed V-shape.

4. The light pole assembly of claim 3 wherein the lower end of the upper pole member includes a pair of spaced apart plate members each having the protruding V-shape, and wherein the upper end of the lower pole member includes a pair of spaced apart plate members each having the recessed V-shape, the at least one slot formed as a slot through each of the plate members of the lower end of the upper pole member.

5. The light pole assembly of claim 4 wherein the upper pole member includes an elongated polygonal member to which the plate members of the lower end of the upper pole member are mounted, and therein the lower pole member includes an elongated polygonal member to which the plate members of the upper end of the lower pole member are mounted, the at least one aperture of the upper end of the lower pole member defined through the polygonal member of the lower pole member.

6. The light pole assembly of claim 1 wherein the biasing mechanism includes a spring having a first end fixed to the upper pole member and a second end fixed to the biasing pin for urging the upper pole member toward the lower pole member and thereby urging the upper pole member to the upright position.

7. The light pole assembly of claim 6 wherein the spring is received inside the upper pole member.

8. The light pole assembly of claim 1 wherein the biasing mechanism includes a spring having a first end secured to a lower end of the upper pole member and a second end secured to an upper end of the lower pole member.

9. The light pole assembly of claim 8 further including a tension member having a first end secured to the upper pole member and a second end secured to the lower pole member, the tension member configured and disposed in eccentric relation relative to a light pole axis defined by the upper and lower pole members so as to allow the upper pole member to bend relative to the lower pole member against the urging of the spring only in a direction where a compression force is applied to the tension member.

10. The light pole assembly of claim 9 wherein the tension member is a chain.

11. A break-away pole assembly, comprising:
an upper pole member;
a lower pole member; and
a resettable break-away joint connecting a lower end of the upper pole member to an upper end of the lower pole member, the resettable break-away joint having a biasing mechanism connected to the upper and lower pole members, the biasing mechanism urging the upper pole member into an upright position, wherein the resettable break-away joint includes at least one aperture defined in the lower end of the upper pole member and at least one elongated aperture defined in the upper end of the lower pole member, and wherein the biasing mechanism includes a pin received through the at least one aperture and the at least one elongated aperture, relative movement between the pin and the at least one elongated aperture from a first position to a second position corresponds to the upper pole member moving from the upright position to a collapsed position.

12. The break-away pole assembly of claim 11 wherein the biasing mechanism further includes a spring having a first end fixed to the upper pole member and a second end fixed to the lower pole member, the spring urging the upper pole member toward the upright position where the pin is in a first position relative to the at least one elongated aperture.

13. The break-away pole assembly of claim 12 wherein the spring is received inside the upper pole member with the second end of the spring substantially fixed relative to the biasing pin and the first end of the spring substantially fixed relative to a pin extending through the upper pole member at a location longitudinally spaced apart from the at least one elongated aperture.

14. A break-away pole assembly comprising:
an upper pole member;
a lower pole member; and
a resettable break-away joint connecting a lower end of the upper pole member to an upper end of the lower pole member, the resettable break-away joint having a biasing mechanism connected to the upper and lower pole members, the biasing mechanism urging the upper pole member into an upright position, wherein the biasing mechanism includes:
a spring having a first end secured to a lower end of the upper pole member and a second end secured to an upper end of the lower pole member; and
a tension member having a first end secured to the upper pole member and a second end secured to the lower pole member, the tension member offset relative to the spring to allow the upper pole member to bend relative to the lower pole member against the urging of the spring only in a single direction where a compression force is applied to the tension member.

15. The break-away pole assembly of claim 11 wherein the lower end of the upper pole member has a protruding V-shape and the upper end of the lower pole member has a recessed V-shape, the protruding V-shape overlapping a central portion of the upper end of the lower pole member.

16. A resettable break-away joint for a pole assembly, comprising:
a lower end of an upper pole member;
an upper end of a lower pole member; and
a biasing mechanism urging the lower end of the upper pole member toward engagement with the upper end of the lower pole member to urge the upper pole member toward an upright position until the upper pole member is moved to a collapsed position wherein the lower end includes spaced apart plates each having a protruding V-shape and the upper end includes spaced apart lower plates each defining a complementary V-shaped recess, the biasing mechanism urging the protruding V-shape of each of the upper plates into the respective V-shaped recess of the lower plates, and wherein a fitted aperture is defined in the upper end of the lower pole member and an elongated aperture is defined in each of the plates of the upper pole member, the elongated apertures in registry with the fitted aperture.

* * * * *